(No Model.)

H. W. FISHEL.
BOUTONNIÈRE.

No. 507,533. Patented Oct. 31, 1893.

WITNESSES:
William M. Iliff
William A. Pollock

INVENTOR
Henry W. Fishel
BY Edwin H. Brown
his ATTORNEY

UNITED STATES PATENT OFFICE.

HENRY W. FISHEL, OF NEW YORK, N. Y.

BOUTONNIÈRE.

SPECIFICATION forming part of Letters Patent No. 507,533, dated October 31, 1893.

Application filed April 15, 1893. Serial No. 470,471. (No model.)

*To all whom it may concern:*

Be it known that I, HENRY W. FISHEL, of the city, county, and State of New York, have invented a new and useful Improvement in Boutonnières, of which the following is a specification.

The object of my improvement is to furnish a boutonnière, with a reservoir, for perfume or water, whence may be ejected a spray.
I will describe a boutonnière, embodying my improvement, and point out the novel features in the claims.

Figure 1:
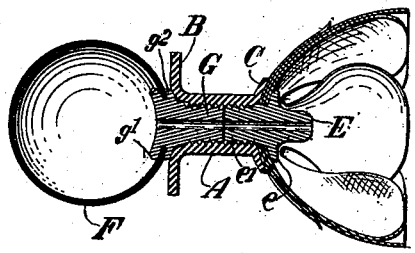
Figure 3:
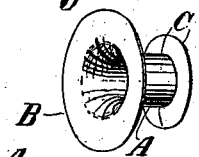
Figure 4:
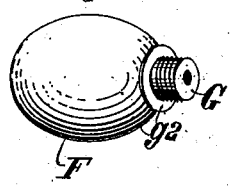
Figure 2:

In the accompanying drawings, Figure 1 is a central longitudinal section on an enlarged scale. Fig. 2 is a perspective view of a nozzle, comprised in the stem. Fig. 3 is a perspective view of the body of the boutonnière. Fig. 4 is a perspective view of the reservoir, and a nipple with which it is provided.
Similar letters of reference designate corresponding parts in all the figures.

A designates the body of the boutonnière. It may be made of sheet metal. As here shown, it consists of a tubular stem A, having a flange, shoe or back plate B, at the rear extremity, and provided, at the forward extremity, with a flange C, consisting of a socket for sustaining the flower D. The parts A, B, C, may be made in one integral piece, and the stem is intended to open through the back plate and through the socket. The flower D may be made of leaves of celluloid, or analogous material, fitted together so as to bear against the socket. Within the flower is a nozzle E, which may be made of metal, with a flange $e$, and a screw-threaded portion $e'$ capable of being screwed into the front portion of the stem A. The flange $e$ will hold the leaves of the flower in or against the socket.
F designates the reservoir, preferably consisting of a bulb of soft india rubber. It is provided with a nipple G, which may be most advantageously made of metal, with two flanges $g'$ $g^2$. The bulb or reservoir has a hole into which the flange $g'$ may be inserted. The nipple is screw-threaded, so that it may engage with the interior of the rear portion of the stem A.

The reservoir is so small that the boutonnière may be slipped through an ordinary button hole in the lapel of a coat, and the reservoir will be accommodated behind the lapel.

I am unwilling to confine myself to any particular shape for the reservoir, as it is only essential to provide for reducing the interior capacity so as to eject liquid therefrom.

It is intended that the nozzle within the flower shall not be covered by any portion of the flower, in order that when any one invited to smell the flower avails himself of the invitation the wearer of the flower may compress the reservoir and eject perfume or water in the nozzle.

What I claim as my invention, and desire to secure by Letters Patent, is—

1. A boutonnière made in the form of a button or stud and provided with a reservoir and a nozzle, for ejecting a liquid, substantially as specified.

2. A boutonnière made in the form of a button or stud and having a hollow stem a liquid reservoir communicating with one end of the stem, and a nozzle at the other end of the stem, substantially as specified.

In testimony whereof I have signed my name to this specification in the presence of two subscribing witnesses.

HENRY W. FISHEL.

Witnesses:
   ANTHONY GREF,
   WM. A. POLLOCK.